United States Patent
Strong

(10) Patent No.: US 7,751,430 B2
(45) Date of Patent: Jul. 6, 2010

(54) SELF OPTIMIZATION OF TIME DIVISION DUPLEX (TDD) TIMING AND ADAPTIVE MODULATION THRESHOLDS

(75) Inventor: Peter N. Strong, Newton Abbot (GB)

(73) Assignee: Motorola, Inc., Schaumburg, IL (US)

( * ) Notice: Subject to any disclaimer, the term of this patent is extended or adjusted under 35 U.S.C. 154(b) by 1029 days.

(21) Appl. No.: 11/456,578

(22) Filed: Jul. 11, 2006

(65) Prior Publication Data

US 2007/0014257 A1  Jan. 18, 2007

Related U.S. Application Data

(60) Provisional application No. 60/699,079, filed on Jul. 14, 2005.

(51) Int. Cl.
*H04W 72/00* (2009.01)
*H04J 3/16* (2006.01)
*H04J 3/22* (2006.01)

(52) U.S. Cl. ............. 370/465; 370/468; 370/470; 455/522; 455/452.1; 455/452.2

(58) Field of Classification Search .......... 455/522, 455/101–103, 522.1, 452.1, 452.2, 453; 370/328, 370/329, 330, 339, 203, 206, 208, 341, 465, 370/468, 470; 375/267, 229, 347
See application file for complete search history.

(56) References Cited

U.S. PATENT DOCUMENTS 5,307,351 A * 4/1994 Webster .............. 370/470

2004/0190451 A1 * 9/2004 Dacosta ............. 370/230
2006/0146705 A1 * 7/2006 Waxman ........... 370/230
2007/0255793 A1   11/2007 Kwon

FOREIGN PATENT DOCUMENTS

| EP | 0942550 A | 9/1999 |
| EP | 0998069 A | 5/2000 |
| WO | WO9918685 A | 4/1999 |
| WO | WO02085055 A2 | 10/2002 |
| WO | WO2007071009 A1 | 6/2007 |
| WO | WO2004081732 A2 | 9/2009 |

* cited by examiner

*Primary Examiner*—George Eng
*Assistant Examiner*—Wesley L Kim
(74) *Attorney, Agent, or Firm*—Lalita W. Pace; Anthony P. Curtis

(57) ABSTRACT

A wireless broadband communication system that operates with high efficiency and reduced latency in long range point-to-point and point-to-multipoint applications. The system includes multiple transceivers and multiple antennas for transmitting and receiving wireless signals using TDD techniques over multiple channels, which include a control channel for setting both the size of the transmit bursts and the modulation threshold level. By determining the size of the transmit bursts for a subsequent data transmission based upon the number of filler packets detected in a specified number of previously received bursts, and adjusting the modulation threshold level for the subsequent transmission based upon the transmit burst size, the system provides increased data throughput, while maintaining the packet error rate at an acceptable level. As the throughput requirements of the system are relaxed, the modulation threshold levels can be adjusted to provide reduced packet error rates.

28 Claims, 4 Drawing Sheets

SELF OPTIMIZATION OF TIME DIVISION DUPLEX (TDD) TIMING AND ADAPTIVE MODULATION THRESHOLDS

CROSS REFERENCE TO RELATED APPLICATIONS

This application claims benefit of U.S. Provisional Patent Application No. 60/699,079 filed Jul. 14, 2005 entitled SELF-OPTIMIZATION OF TIME DIVISION DUPLEX (TDD) TIMING AND ADAPTIVE MODULATION THRESHOLDS.

STATEMENT REGARDING FEDERALLY SPONSORED RESEARCH OR DEVELOPMENT

Not applicable

BACKGROUND OF THE INVENTION

The present invention relates generally to wireless broadband communication systems, and more specifically to a system and method of increasing the data throughput of wireless broadband communication systems.

Wireless communication systems are known that are capable of providing broadband services in point-to-point and point-to-multipoint applications. Such wireless broadband communication systems may be deployed in remote geographical regions to provide users located in those regions with high speed Internet access. Such systems may also be employed by users wishing to set up communication links and networks accessible from locations within urban environments, and/or from locations dispersed across significant geographical distances.

A conventional wireless broadband communication system may be implemented as a line-of-sight (LOS) or non-line-of-sight (NLOS) system. For example, a LOS wireless communication system typically includes a directional antenna installed at one or more user locations within the line-of-sight of an antenna disposed at a base station. Further, a NLOS wireless communication system typically includes multiple transmit antennas disposed at a transmitter location and multiple receive antennas disposed at a receiver location. The transmitters within the NLOS system may transmit signals using known space-time coding and modulation techniques, while the receivers capture the transmitted signals and employ known signal processing techniques to decode and demodulate the transmitted signals, thereby recovering user data. The transmit and receive antennas of the NLOS system may be deployed in environments that include numerous scattering objects such as buildings, trees, hills, automobiles, etc. Within such an environment, the transmitted signals generally undergo multi-path propagation between the transmitters and the receivers while being scattered by the various objects within the environment. Such a multi-path environment allows multiple paths to be established between the transmitters and the receivers. By transmitting user data in parallel over these multiple paths, high data throughput and high spectral efficiencies can be achieved.

However, conventional wireless broadband communication systems like the LOS and NLOS systems described above have drawbacks. For example, such conventional wireless communication systems are typically configured to transmit and receive wireless signals using time division duplex (TDD) techniques. Although wireless broadband communication systems employing TDD techniques have been employed in long range point-to-point and point-to-multipoint applications, such systems have traditionally suffered from high latency, which is proportional to the transit time of the wireless signals from source to destination. High latency can significantly limit the data throughput of such systems in long range applications, especially when the number of point-to-point hops is large and/or the bandwidth requirement is high.

It would therefore be desirable to have a wireless broadband communication system that provides increased data throughput. Such a wireless broadband communication system would operate with high efficiency in long range point-to-point and point-to-multipoint applications while reducing the latency time in such applications.

BRIEF SUMMARY OF THE INVENTION

In accordance with an embodiment of the present invention, a wireless broadband communication system is provided that operates with high efficiency and reduced latency in long range point-to-point and point-to-multipoint applications. The presently disclosed wireless broadband communication system transmits and receives wireless signals using time division duplex (TDD) techniques, and determines the size of the transmit bursts for a subsequent data transmission based upon the number of filler packets detected in a predetermined number of previously received bursts. In another embodiment of the present invention, the disclosed system also adjusts modulation threshold levels for the subsequent transmission based upon the size of the transmit bursts.

In one embodiment, the wireless broadband communication system includes a plurality of transceivers and a plurality of antennas operable to transmit and receive wireless signals over a plurality of communication channels, which includes at least one control channel that may be employed to adjust the size of the transmit bursts and to set a modulation mode. For example, the wireless communication system may be implemented as a 2:2 MIMO system including two antennas disposed at each end of a communication link. Further, orthogonal frequency division modulation (OFDM) waveforms may be employed to transmit the wireless signals over multiple orthogonal channels. The wireless communication system is configured to transmit and receive wireless signals over the multiple channels using TDD techniques. The system is also configured to perform adaptive modulation to allow the signals to be transmitted over the channels using selected modulation modes, which may be defined by one or more transmission parameters including a modulation threshold level, a coding rate, a symbol rate, a transmission power level, antenna directional parameters, and space-time coding parameters.

In one mode of operation, the presently disclosed wireless communication system includes first and second transceivers deployed at opposite ends of a communication link. The first transceiver is operative to transmit a predetermined number "n" of data bursts over at least one channel from one end of the communication link to the other end of the link, and the second transceiver is operative to receive the predetermined number n of data bursts. In this mode of operation, the size of each transmit burst may be adjusted to correspond to one of a predetermined number "N" of burst sizes. For example, the size of each transmit burst may be adjusted to one of N=4 burst sizes, which may correspond to 10, 20, 30, or 40 OFDM symbols. Further, each burst received by the second transceiver may contain one or more data packets and zero or more filler packets. The second transceiver is operative to determine the number "d" of receive bursts that contain at least one data packet and no filler packets. Based upon the number d of receive bursts that contain only data and no filler packets, the second transceiver determines the burst size for the next predetermined number n of transmit bursts, and provides a command to the first transceiver to adjust the size of the transmit bursts accordingly via the control channel. For example, assuming that the current burst size corresponds to 20 OFDM symbols, if the number d of receive bursts that contain only data and no filler packets is equal to the predetermined number n of data bursts (i.e., d=n), then the burst size for the next predetermined number n of transmit bursts may be adjusted to the next larger burst size, i.e., from 20 OFDM symbols to 30 OFDM symbols. If the number d of receive bursts that contain only data and no filler packets is less than the predetermined number N of burst sizes (i.e., d<N), then the burst size for the next predetermined number n of transmit bursts may be adjusted to the next smaller burst size, i.e., from 20 OFDM symbols to 10 OFDM symbols. Otherwise, the burst size for the next predetermined number n of transmit bursts remains unchanged.

As an alternative to the example above, assuming that the current burst size corresponds to 20 OFDM symbols, if the number d of receive bursts that contain only data and no filler packets is greater than or equal to the predetermined number n of data bursts (i.e., d≧n), then the burst size for the next predetermined number n of transmit bursts may be adjusted to the next larger burst size, i.e., from 20 OFDM symbols to 30 OFDM symbols. Then, if the number d of receive bursts that contain only data and no filler packets is less than the predetermined number N of burst sizes (i.e., d<N), then the burst size for the next predetermined number n of transmit bursts may be adjusted to the next smaller burst size, i.e., from 20 OFDM symbols to 10 OFDM symbols.

In a second mode of operation of the wireless communication system, based upon the adjusted burst size determined above, the second transceiver selects the modulation mode for the next predetermined number n of transmit bursts, and provides a command to the first transceiver to employ the selected modulation mode via the control channel. It is noted that employing the selected modulation mode may involve adjusting the modulation threshold level. In this mode of operation, the selected modulation mode corresponds to a specified packet error rate. For example, if the burst size corresponds to 10 OFDM symbols, then the modulation mode may be selected to provide a packet error rate of 1:10000. If the burst size corresponds to 20 OFDM symbols, then the modulation mode may be selected to provide a packet error rate of 1:2000. If the burst size corresponds to 30 OFDM symbols, then the modulation mode may be selected to provide a packet error rate of 1:500. If the burst size corresponds to 40 OFDM symbols, then the modulation mode may be selected to provide a packet error rate of 1:100.

By determining the size of the transmit bursts for a subsequent data transmission based upon the number of filler packets detected in a predetermined number of previously received bursts, and adjusting the modulation threshold level for the subsequent transmission based upon the transmit burst size, the presently disclosed wireless broadband communication system can provide increased data throughput, while maintaining the packet error rate at an acceptable level. Further, as the throughput requirements of the system are relaxed, the modulation threshold levels can be adjusted to provide reduced packet error rates.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

A wireless broadband communication system is disclosed that operates with high efficiency and reduced latency in long range point-to-point and point-to-multipoint applications. In a first embodiment, the presently disclosed wireless broadband communication system employs time division duplex (TDD) techniques, and determines the size of transmit bursts for subsequent data transmissions based upon the number of filler packets detected in a predetermined number of previously received bursts. In a second embodiment, the disclosed wireless communication system performs adaptive modulation to assure that the packet error rates for the subsequent transmissions are maintained at acceptable levels.

Figure 1:
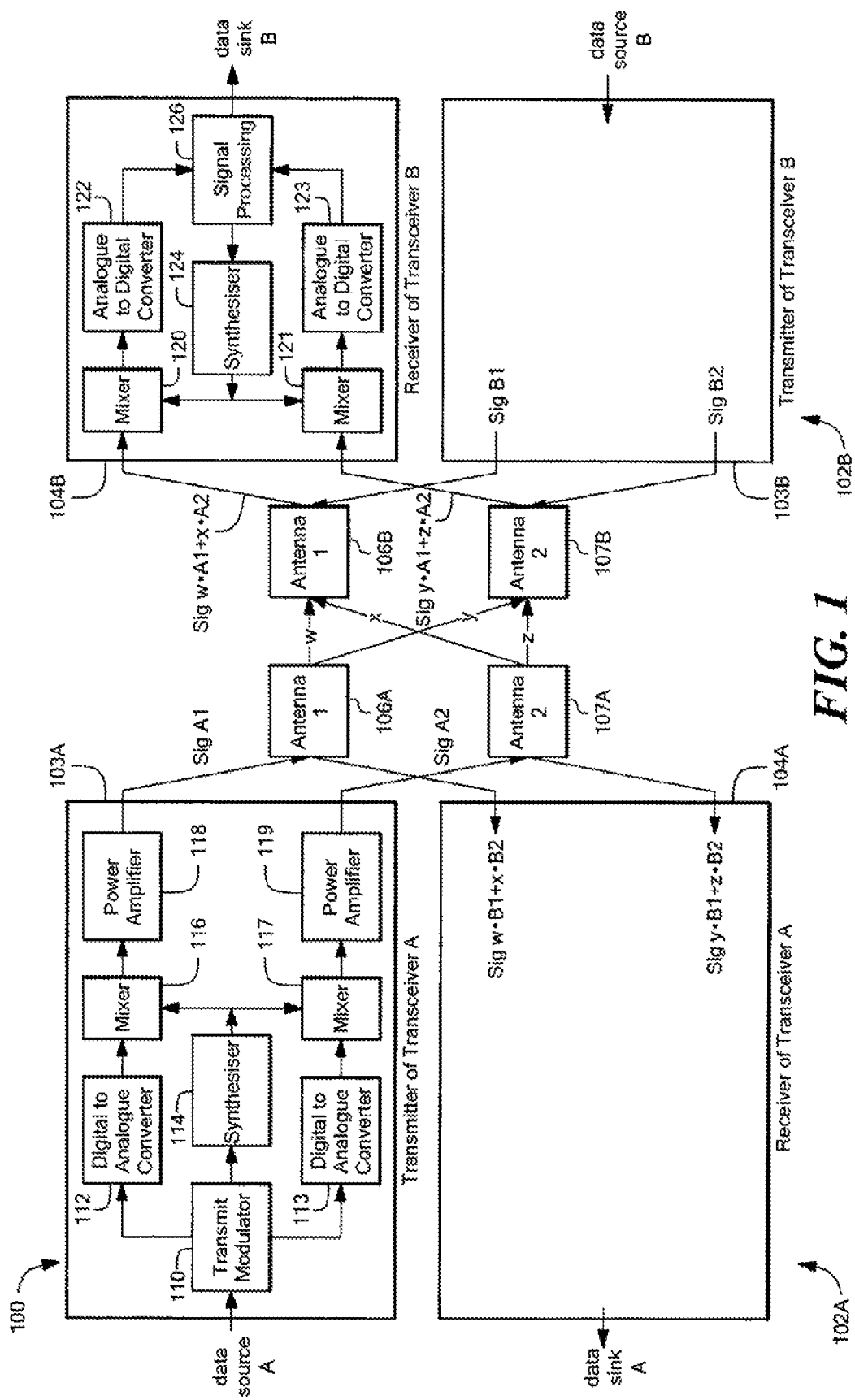
FIG. 1 is a block diagram of a wireless broadband communication system in which the presently disclosed technique for increasing data throughput may be employed, in accordance with the present invention.

FIG. 1 depicts an illustrative embodiment of a wireless broadband communication system 100 in which the present invention may be employed. In the illustrated embodiment, the wireless broadband communication system 100 includes a plurality of transceivers 102A-102B, and a plurality of high gain antennas 106A-107A, 106B-107B. It is understood that the transceiver 102A and the high gain antennas 106A-107A may be deployed at one end of a communication link (not numbered), and the transceiver 102B and the high gain antennas 106B-107B may be deployed at the other end of the link. For example, the wireless communication system 100 may be configured as a 2:2 multiple input multiple output (MIMO) system operative to transmit and receive signals over two channels of information flow, and orthogonal frequency division modulation (OFDM) waveforms may be employed to transmit the wireless signals over the two orthogonal channels. In an alternative embodiment, the wireless communication system 100 may be configured as a 1:2 single input multiple output (SIMO) system operative to transmit and receive signals over a single channel of information flow. It should be appreciated, however, that the wireless communication system 100 may be configured as a 2:4 MIMO system, a 2:n MIMO system, an n:n MIMO system, a 1:4 SIMO system, a 1:n SIMO system, or any other suitable type of MIMO or SIMO system.

As shown in FIG. 1, the transceiver 102A is connected to the antennas 106A-107A at one end of the communication link, and the transceiver 102B is connected to the antennas 106B-107B at the other end of the link. The antennas 106A-

107A, 106B-107B are operative to transmit and receive signals propagating along up to four signal paths w, x, y, z between the respective ends of the link. The transceiver 102A includes a transmitter 103A and a low noise receiver 104A, and the transceiver 102B includes a transmitter 103B and a low noise receiver 104B.

The transmitter 103A includes the following functional components: a transmit modulator 110, a pair of digital-to-analog (D-to-A) converters 112-113, a frequency synthesizer 114, a pair of mixers 116-117, and a pair of power amplifiers 118-119. It is understood that the transmitter 103B can include the same functional components as the transmitter 103A. FIG. 1 depicts the functional components of the transmitter 103A for clarity of illustration. Specifically, a data source A provides user data to the transmit modulator 110, which provides modulated data outputs to the D-to-A converters 112-113 and controls the operation of the synthesizer 114. The D-to-A converters 112-113 convert the outputs of the transmit modulator 110 to analog signals, and provide the analog signals to the mixers 116-117. Next, the synthesizer 114 provides suitable synthesized carriers to the mixers 116-117, which mix up the analog signals to wireless frequencies. The power amplifiers 118-119 then amplify the wireless signals, and provide the amplified signals to the antennas 106A-107A for subsequent transmission over the communication link.

The receiver 104B includes the following functional components: a pair of mixers 120-121, a pair of analog-to-digital (A-to-D) converters 122-123, a frequency synthesizer 124, and a signal processing unit 126. It is understood that the receiver 104A can include the same functional components as the receiver 104B. FIG. 1 depicts the functional components of the receiver 104B for clarity of illustration. Specifically, the wireless signals received by the antennas 106B-107B are provided to the mixers 120-121, respectively, which mix the signals to analog baseband signals using suitable synthesized frequencies generated by the synthesizer 124. Next, the A-to-D converters 122-123 convert the analog baseband signals to digital baseband signals. The signal processing unit 126 then decodes and demodulates the digital signals to recover the user data, which is subsequently provided to a data sink B. The signal processing unit 126 also controls the operation of the synthesizer 124. In one embodiment, the signal processing unit 126 operates as a maximum ratio combiner (MRC; also known as an optimum combiner), which combines the signals by conceptually rotating the phase of each signal to be in alignment and adjusting the amplitude of each signal to maximize the combined signal-to-noise ratio.

It is noted that the data sources A-B and the data sinks A-B may comprise respective connections to one or more local area networks (LANs) or routers. Alternatively, the data sources A-B and the data sinks A-B may comprise direct connections to respective user devices. In addition, each one of the transceivers 102A-102B may be implemented as a software-defined radio. For example, the transmit modulator 110 included in each transmitter 103A-103B may employ channel modulation waveforms that are defined in software, and the signal processing unit 126 included in each receiver 104A-104B may demodulate the channel waveforms using demodulation techniques that are defined in software. It should therefore be appreciated that the functions necessary to implement the transceivers 102A-102B may be embodied in whole or in part using hardware or software or some combination thereof using, for example, signal processors, microcontrollers, microprocessors, or any other suitable hardware and/or software. The various components of the wireless communication system 100 of FIG. 1 are further described in co-pending U.S. patent application Ser. No. 11/115,943 filed Apr. 27, 2005 entitled MULTIPLE INPUT MULTIPLE OUTPUT (MIMO) WIRELESS COMMUNICATIONS SYSTEM (the "'943 application") and assigned to the same assignee as the present invention.

Figure 2:
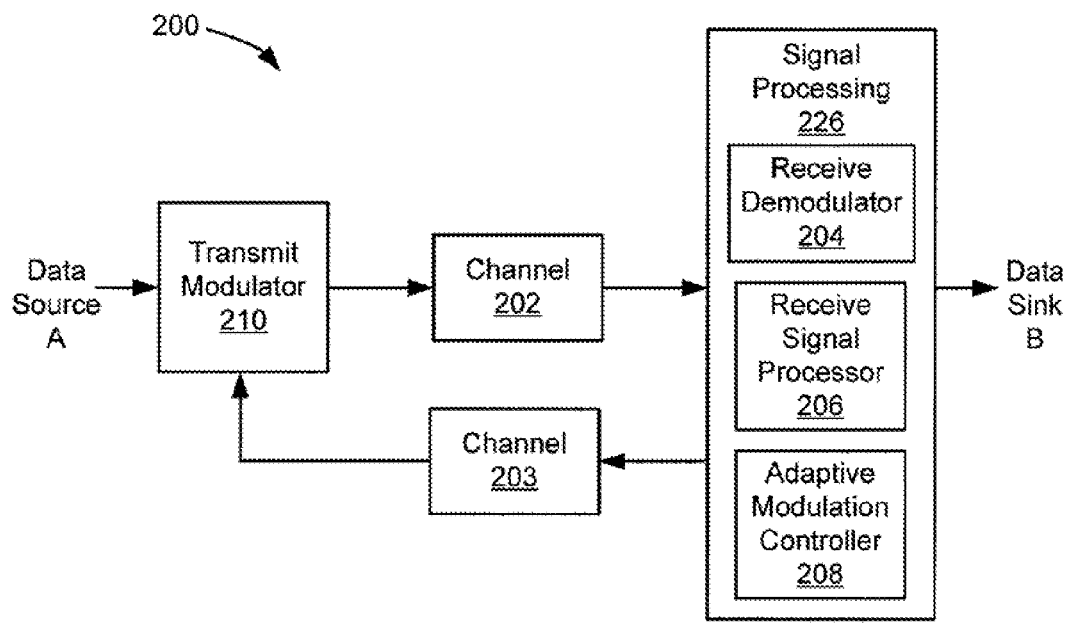
FIG. 2 is a block diagram of a wireless signal modulation/demodulation sub-system within the system of FIG. 1, in which the disclosed technique for increasing data throughput may be implemented.

FIG. 2 depicts an illustrative embodiment of a wireless signal modulation-demodulation sub-system 200, in which novel aspects of the method of the present invention may be implemented. As shown in FIG. 2, the wireless signal modulation-demodulation sub-system 200 includes a transmit modulator 210, and a signal processing unit 226 including a receive demodulator 204, a receive signal processor 206, and an adaptive modulation controller 208. In the presently disclosed embodiment, the transmit modulator 210 generally corresponds to the transmit modulator 110 included in the transmitter 103A or 103B (see FIG. 1), and the signal processing unit 226 generally corresponds to the signal processing unit 126 included in the receiver 104A and 104B (see FIG. 1). The receive signal processor 206 is operative to perform portions of the method of the present invention by detecting the number of filler packets in a predetermined number of receive bursts, and determining the size of transmit bursts based upon the detected number of filler packets. It is noted that for accurately detecting the number of filler packets in the receive bursts, a clock (not shown) included in the receiver 104A or 104B can be synchronized with the received signal using any suitable synchronization technique. The adaptive modulation controller 208 is operative to perform adaptive modulation including selecting a modulation mode to assure that the packet error rate is maintained at a level that is consistent with the throughput requirements of the system 100 (see FIG. 1).

As further shown in FIG. 2, representative channels 202-203 are disposed between the transmit modulator 210 and the signal processing unit 226. The channel 202 represents one of the communication channels available to the wireless communication system 100 for transmitting and receiving wireless signals between the transmitter and receiver locations. Further, the channel 203 represents a control channel that may be employed to transmit one or more commands for adjusting the size of the transmit bursts and for setting the modulation mode, which may be defined by one or more transmission parameters including a modulation threshold level, a coding rate, a symbol rate, a transmission power level, antenna directional parameters, and space-time coding parameters.

Figure 3:
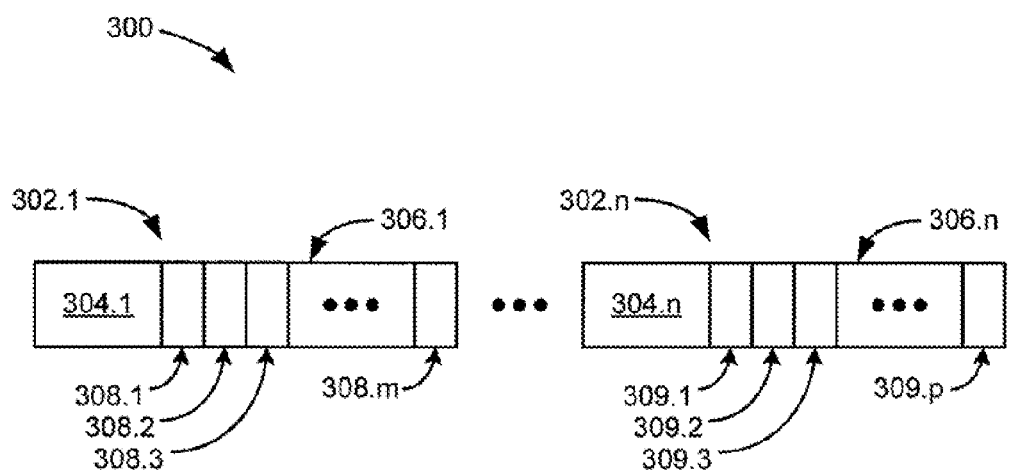
FIG. 3 illustrates an exemplary data burst including at least one data packet and zero or more filler packets, which may be transmitted by the system of FIG. 1.

As described above, the presently disclosed wireless broadband communication system employs time division duplex (TDD) techniques, and determines the size of transmit bursts based upon the number of filler packets detected in a predetermined number of previously received bursts. A burst is defined herein as a finite duration wireless signal that is transmitted or received during a single timeslot. FIG. 3 depicts an illustrative burst 300 that may be transmitted or received during a single timeslot over at least one channel between the transceivers 102A-102B within the system 100 (see FIG. 1). As shown in FIG. 3, the burst 300 includes a plurality of packets 302.1-302.$n$. For example, the packet 302.1 may be a data packet beginning with a preamble 304.1 followed by variable length packet data 306.1, which includes a first plurality of OFDM symbols 308.1-308.$m$. Further, the packet 302.$n$ may be a data packet like the packet 302.1. Alternatively, the packet 302.$n$ may be a filler packet beginning with a preamble 304.$n$ followed by variable length filler data 306.$n$, which includes a second plurality of OFDM symbols 309.1-309.$p$. It is noted that the packets 302.1, 302.$n$ may contain the same number of OFDM symbols (i.e., m=p). In the presently disclosed embodiments, each transmit or receive burst may contain one or more data packets and zero or more filler packets. For example, when there are no more data packets to be transmitted during the current timeslot, the transmit burst may contain one or more filler packets to maintain a stream of packets between the transceivers 102A-102B.

The embodiments of the present invention will be better understood with reference to the following illustrative example and FIGS. 1-3. As described above, according to the first embodiment, the wireless communication system 100 (see FIG. 1) includes the transceivers 102A-102B, which may be deployed at opposite ends of a communication link (not numbered). In this illustrative example, the transceiver 102A is operative to transmit a predetermined number "n" of data bursts over the channel 202 (see FIG. 2) from one end of the communication link to the other end of the link, and the transceiver 102B is operative to receive the predetermined number n of data bursts. Further, the size of the transmit bursts is adjusted to correspond to one of a predetermined number "N" of burst sizes. In this example, the predetermined number n of data bursts is equal to 19, and the size of each transmit burst is adjusted to one of N=4 burst sizes, which correspond to 10, 20, 30, or 40 OFDM symbols. Each burst received by the transceiver 102B may contain one or more data packets such as the packet 302.1 (see FIG. 3), and zero or more filler packets such as the packet 302.n (see FIG. 3). The transceiver 102B is operative to determine the number "d" of bursts it receives that contain at least one data packet and no filler packets. Based upon the number d of receive bursts that contain only data and no filler packets, the transceiver 102B determines the burst size for the next predetermined number n of transmit bursts, and provides a command to the transceiver to adjust the size of the transmit bursts accordingly via the control channel 203. In general, if each of the predetermined number N of burst sizes has a corresponding index "t" ranging from 1 to N, then the index t of the burst size for the next predetermined number n of transmit bursts may be determined as follows.

If d=n, then increase t by 1. (1)

Else if d<N<n, then decrease t by 1. (2)

Else t remains at the previous value. (3)

In this example, the predetermined number n of data bursts is equal to 19, and the size of each transmit burst is adjusted to one of N=4 burst sizes corresponding to 10, 20, 30, or 40 OFDM symbols, which in turn have corresponding indices t ranging from 1 to 4, respectively. Accordingly, the index t of the burst size for the next predetermined number n=19 of transmit bursts may be determined as follows.

If d=19, then increase t by 1. (4)

Else if d<4, then decrease t by 1. (5)

Else t remains at the previous value. (6)

In a second embodiment, based upon the adjusted transmit burst size determined above, the transceiver 102B selects the modulation mode for the next predetermined number n of bursts, and provides a command to the transceiver 102A to employ the selected modulation mode via the control channel 203. It is noted that employing the selected modulation mode may involve adjusting the modulation threshold level, the coding rate, the symbol rate, the transmission power level, the antenna directional parameters, the space-time coding parameters, and/or any other suitable transmission parameter. In this example, the selected modulation mode has a corresponding packet error rate. In general, if the index t corresponds to the size of the transmit burst, then for each successive increase in the value of the index t indicating a stepped increase in the transmit burst size, the modulation mode is selected to provide a successively higher packet error rate. As indicated above, the N=4 burst sizes correspond to 10, 20, 30, or 40 OFDM symbols, which in turn correspond to the indices t ranging from 1 to 4, respectively. Accordingly, the modulation mode is selected as follows.

If t=1, then select the modulation mode to provide a packet error rate of 1:10000. (7)

Else if t=2, then select the modulation mode to provide a packet error rate of 1:2000. (8)

Else if t=3, then select the modulation mode to provide a packet error rate of 1:500. (9)

Else if t=4, then select the modulation mode to provide a packet error rate of 1:100. (10)

By determining the size of the transmit bursts for the next data transmission based upon the number of filler packets detected in the predetermined number n of previously received bursts, and selecting the modulation mode for the next transmission based upon the size of the transmit bursts, the wireless broadband communication system 100 can provide increased data throughput while maintaining the packet error rate at an acceptable level. Further, as the throughput requirements of the system 100 are relaxed, the modulation mode can be selected to provide reduced packet error rates.

In the illustrative example above, it is understood that the values for the predetermined number n of data bursts and the predetermined number N of burst sizes are provided for purposes of illustration only, and that any other suitable values for the number of data bursts and the number of burst sizes may be employed. It is also understood that any other suitable values for the burst sizes and/or the packet error rates may be employed. In addition, in an alternative mode of operation, the expression (1) above may be modified so that the index t is increased by 1 if d is greater than or equal to n (i.e., $d \geq n$).

Figure 4A:
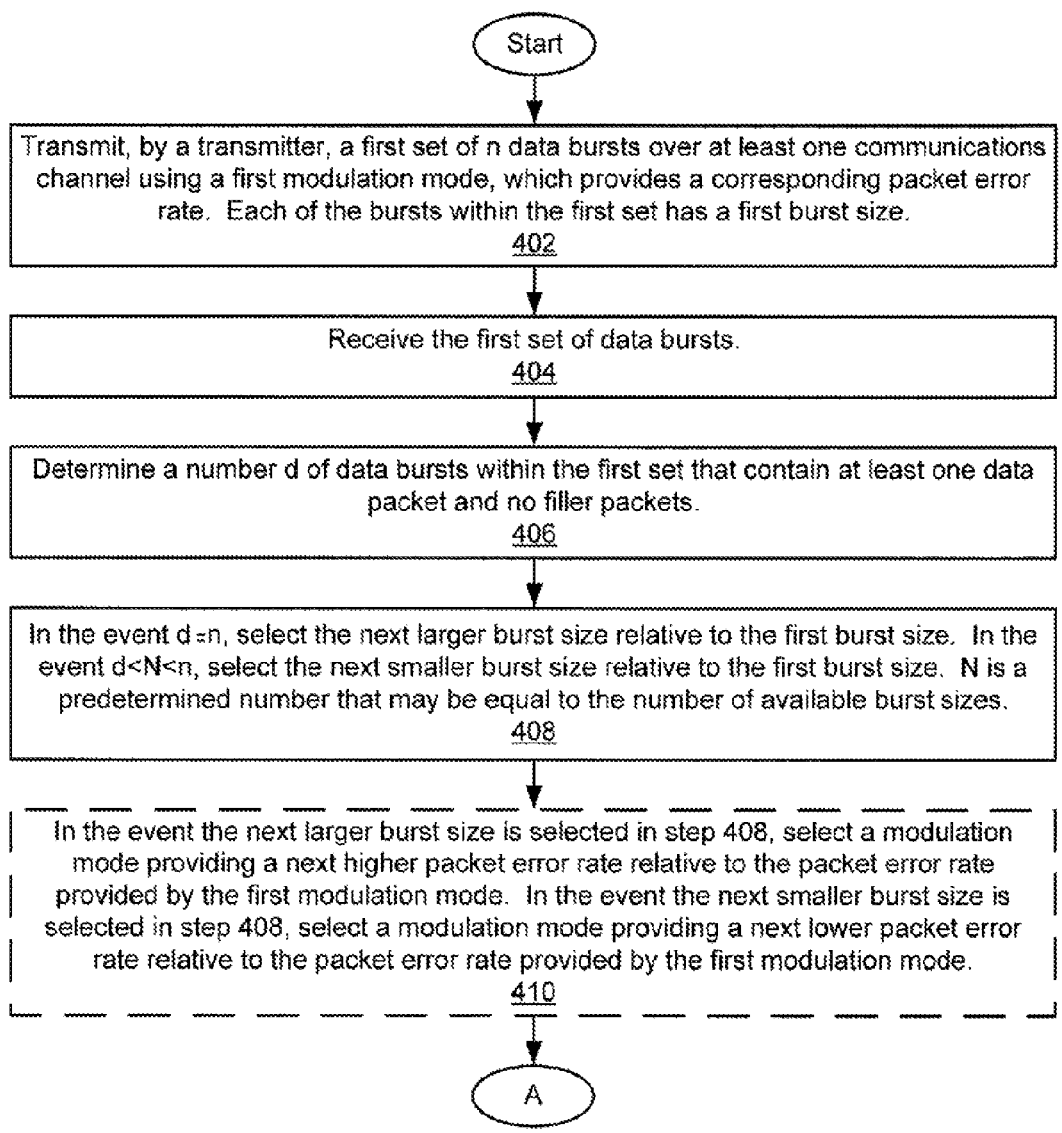
FIGS. 4a-4b are a flow diagram of a method of increasing the data throughput of the system of FIG. 1.
Figure 4B:
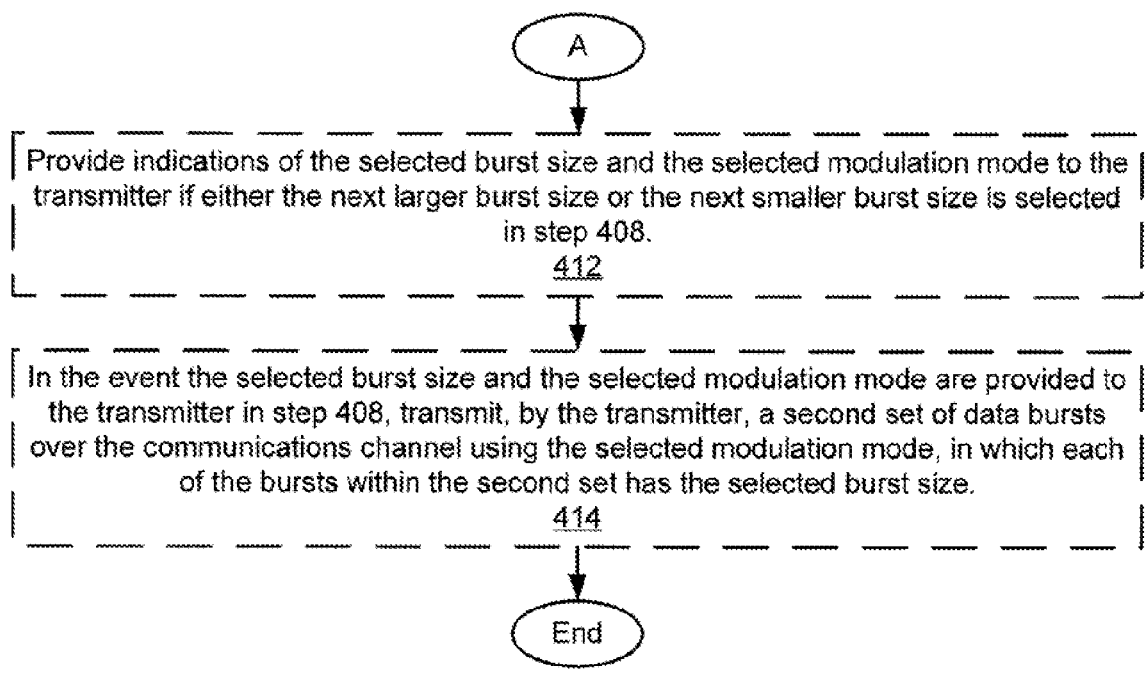

A method of operating the presently disclosed wireless broadband communication system in accordance with the embodiments of the present invention is described below with reference to FIGS. 1 and 4a-4b. As depicted in step 402 (see FIG. 4a), a first set of data bursts is transmitted by the transceiver 102A (see FIG. 1) over at least one communication channel using a first modulation mode, which provides a corresponding packet error rate. The first set of data bursts includes a predetermined number n of bursts. Each of the bursts within the first set has a first one of a predetermined number of available burst sizes. Further, each burst within the first set includes one or more data packets, and zero or more filler packets containing no data. Next, the transceiver 102B receives the first set of data bursts, as depicted in step 404. The transceiver 102B then determines a number d of data bursts within the first set that contain at least one data packet and no filler packets, as depicted in step 406. In the event the number d of data bursts containing at least one data packet and no filler packets is equal to the predetermined number n (d=n), the transceiver 102B selects the next larger burst size relative to the first burst size, as depicted in step 408. In the event the number d of data bursts containing at least one data packet and no filler packets is less than a predetermined number N, which is less than the predetermined number n (d<N<n), the transceiver 102B selects the next smaller burst size relative to the first burst size, as also depicted in step 408. For example, the predetermined number N may be equal to the predetermined number of available burst sizes.

In the event the next larger burst size is selected in step 408, the transceiver 102B may, in a second embodiment of the invention, select a modulation mode providing a next higher packet error rate relative to the packet error rate provided by the first modulation mode, as depicted in step 410. In the event the next smaller burst size is selected in step 408, the transceiver 102B selects a modulation mode providing a next lower packet error rate relative to the packet error rate provided by the first modulation mode, as also depicted in step 410. As depicted in step 412 (see FIG. 4b), the transceiver 102B then provides indications of the selected burst size and the selected modulation mode to the first transceiver 102A if either the next larger burst size or the next smaller burst size is selected in step 408. As depicted in step 414, in the event the selected burst size and the selected modulation mode are provided to the first transceiver 102A in step 408, a second set of data bursts is transmitted by the transceiver 102A over the communication channel using the selected modulation mode, in which each of the bursts within the second set has the selected burst size. Accordingly, based upon the number d of data bursts within the first set that contain at least one data packet and no filler packets, as determined in step 406, the burst size and the modulation mode for the next data burst transmission in step 414 can be selected to provide optimized data throughput, while maintaining the packet error rate at an acceptable level.

It will further be appreciated by those of ordinary skill in the art that modifications to and variations of the above-described system and method for self-optimization of time division duplex (TDD) timing and adaptive modulation thresholds may be made without departing from the inventive concepts disclosed herein. Accordingly, the invention should not be viewed as limited except as by the scope and spirit of the appended claims.

What is claimed is:

1. A method of operating a wireless communication system, said system comprising at least one first transceiver and at least one second transceiver, the method comprising the steps of:
    transmitting, by said first transceiver, a first set of data bursts over at least one communication channel using a first modulation mode, said first modulation mode providing a packet error rate, wherein said first set of data bursts comprises a first predetermined number n of bursts, each of the bursts within said first set having a first burst size and comprising at least one data packet and zero or more intentionally provided filler packets;
    receiving said first set of data bursts by said second transceiver;
    determining a number d of data bursts within said received first set that contain no filler packets; and
    determining a new burst size for a next first predetermined number n of bursts based on the number d of data bursts within said received first set that contain no filler packets.

2. The method of claim 1 wherein the step of determining a new burst size for the next first predetermined number n of bursts comprises: in a first selecting step, selecting a next larger burst size relative to said first burst size if the number d is equal to the first predetermined number n (d=n), and selecting a next smaller burst size relative to said first burst size if the number d is less than a second predetermined number N, said second predetermined number N being less than said first predetermined number n (d<N<n).

3. The method of claim 2 further comprising selecting a modulation mode providing a next higher packet error rate relative to the packet error rate provided by said first modulation mode if the next larger burst size is selected in the first selecting step, and selecting a modulation mode providing a next lower packet error rate relative to the packet error rate provided by said first modulation mode if the next smaller burst size is selected in the first selecting step.

4. The method of claim 3 further comprising providing indications of the selected burst size and the selected modulation mode to said first transceiver when one of the next larger burst size and the next smaller burst size is selected in the first selecting step.

5. The method of claim 4 wherein when the selected burst size and the selected modulation mode are provided to said first transceiver, the method further comprises:
    transmitting, by said first transceiver, a second set of data bursts over said communication channel using said selected modulation mode, each of the bursts within said second set having said selected burst size;
    otherwise, transmitting said second set of data bursts over said communication channel using said first modulation mode, each of the bursts within said second set having said first burst size.

6. The method of claim 5 wherein said first set of data bursts and said second set of data bursts comprise the same number n of bursts.

7. The method of claim 4 wherein indications of the selected burst size and the selected modulation mode are provided to said first transceiver by said second transceiver transmitting the indications over a control channel.

8. The method of claim 2 wherein the first selecting step further comprises selecting the next larger burst size relative to said first burst size if d is greater than n (d>n).

9. The method of claim 8 wherein each of said first burst size, said next larger burst size, and said next smaller burst size is one of a plurality of burst sizes, and wherein the second predetermined number N is equal to a number of burst sizes within said plurality of burst sizes.

10. The method of claim 1 wherein determining a number d of data bursts within said received first set that contain no filler packets comprises determining, by said second transceiver, the number d of data bursts within said received first set that contain no filler packets.

11. The method of claim 1 wherein the transmitting step comprises transmitting said first set of data bursts over said communication channel using said first modulation mode, and wherein each packet within each burst comprises at least one orthogonal frequency division modulation (OFDM) symbol.

12. The method of claim 11 wherein the size of each burst corresponds to a number of OFDM symbols included in the respective burst.

13. The method of claim 1 wherein the step of determining a new burst size for the next first predetermined number n of bursts comprises: in a first selecting step, selecting a next larger burst size relative to said first burst size if the number d is greater than the first predetermined number n (d>n), and selecting a next smaller burst size relative to said first burst size if the number d is less than a second predetermined number N, said second predetermined number N being less than said first predetermined number n (d<N<n).

14. A wireless communication system, comprising:
    at least one first transceiver operative to transmit a first set of data bursts over at least one communication channel using a first modulation mode, said first modulation mode providing a packet error rate,
    wherein said first set of data bursts comprises a first predetermined number n of bursts, each of the bursts within said first set having a first burst size and comprising at least one data packet and zero or more intentionally provided filler packets; and at least one second transceiver, said second transceiver being operative:

to receive said first set of data bursts;

to determine a number d of data bursts within said received first set that contain no filler packets; and to determine a new burst size for a next first predetermined number n of bursts based on the number d of data bursts within said received first set that contain no filler packets.

15. The system of claim 14 wherein the at least one second transceiver is configured to determine a new burst size for the next first predetermined number n of bursts based on the number d of data bursts within said received first set that contain no filler packets by selecting a next larger burst size relative to said first burst size if the number d is equal to the first predetermined number n (d=n), and selecting a next smaller burst size relative to said first burst size if the number d is less than a second predetermined number N, said second predetermined number N being less than said first predetermined number n (d<N<n).

16. The system of claim 15 wherein the at least one second transceiver is further operative to select a modulation mode providing a next higher packet error rate relative to the packet error rate provided by said first modulation mode if the next larger burst size is selected, and to select a modulation mode providing a next lower packet error rate relative to the packet error rate provided by said first modulation mode if the next smaller burst size is selected.

17. The system of claim 16 wherein the at least second transceiver is further operative to provide indications of the selected burst size and the selected modulation mode to said first transceiver.

18. The system of claim 17 wherein the at least one first transceiver is further operative, in the event the selected burst size and the selected modulation mode are provided to said first transceiver, to transmit a second set of data bursts over said communication channel using said selected modulation mode, each of the bursts within said second set having said selected burst size.

19. The system of claim 18 wherein said first set of data bursts and said second set of data bursts comprise the same number n of bursts.

20. The system of claim 15 wherein each of said first burst size, said next larger burst size, and said next smaller burst size is one of a plurality of burst sizes, and wherein the second predetermined number N is equal to a number of burst sizes within said plurality of burst sizes.

21. The system of claim 14 wherein the predetermined number n is equal to a number of bursts within said first set.

22. The system of claim 14 wherein said second transceiver is further operative to transmit the indications of the selected burst size and the selected modulation mode to said first transceiver over a control channel.

23. The system of claim 14 wherein each packet within each burst comprises at least one orthogonal frequency division modulation (OFDM) symbol.

24. The system of claim 23 wherein the size of each burst corresponds to a number of OFDM symbols included in the respective burst.

25. The system of claim 24 wherein the communication link is a broadcast style point-to-multipoint link.

26. The system of claim 14 wherein said at least one first transceiver is disposed at one end of a communication link, and said at least one second transceiver is disposed at an opposite end of the communication link.

27. The system of claim 26 wherein the communication link is a broadcast style point-to-point link.

28. The system of claim 14 wherein the at least one second transceiver is configured to determine a new burst size for the next first predetermined number n of bursts based on the number d of data bursts within said received first set that contain no filler packets by selecting a next larger burst size relative to said first burst size if the number d is greater than the first predetermined number n (d>n), and selecting a next smaller burst size relative to said first burst size if the number d is less than a second predetermined number N, said second predetermined number N being less than said first predetermined number n (d<N<n).

* * * * *